Dec. 30, 1941.  J. W. BRYCE  2,267,812
CLOCK TIME AND CALL INDICATING SYSTEM
Filed Jan. 11, 1940  7 Sheets-Sheet 1

INVENTOR.
James W. Bryce
BY Cooper, Kerr + Dunham
ATTORNEYS

Dec. 30, 1941.  J. W. BRYCE  2,267,812
CLOCK TIME AND CALL INDICATING SYSTEM
Filed Jan. 11, 1940  7 Sheets-Sheet 3

INVENTOR.
James W. Bryce
BY Cooper, Kerr & Dunham
ATTORNEYS

Dec. 30, 1941. J. W. BRYCE 2,267,812
CLOCK TIME AND CALL INDICATING SYSTEM
Filed Jan. 11, 1940 7 Sheets-Sheet 5

INVENTOR.
James W. Bryce
BY Cooper, Kerr & Dunham
ATTORNEYS

Dec. 30, 1941. J. W. BRYCE 2,267,812
CLOCK TIME AND CALL INDICATING SYSTEM
Filed Jan. 11, 1940 7 Sheets-Sheet 6

FIG.15a.

Patented Dec. 30, 1941

2,267,812

UNITED STATES PATENT OFFICE 2,267,812

CLOCK TIME AND CALL INDICATING SYSTEM

James W. Bryce, Glen Ridge, N. J., assignor to International Business Machines Corporation, New York, N. Y., a corporation of New York Application January 11, 1940, Serial No. 313,355

4 Claims. (Cl. 177—352)

This invention relates to an improved clock system including a master clock and one or more secondary clocks with means for controlling the secondary clocks whereby such clocks may alternatively display clock time indication under control of a master clock or display a call number which is set up by an operator at a station adjacent the master clock.

A further object of the present invention resides in the provision of means for displaying a special indication at each secondary clock when such clock is displaying a call number whereby the persons viewing the clock may know that the clock is displaying a call number and not displaying a time indication.

A further object of the present invention resides in the provision of a combined clock and call indicating system wherein a common set of line wires are employed for transmitting both time signal indications and call number signal indications to the second clock or clocks.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

The present invention relates to an improvement in the clock system shown and described in my copending application Serial No. 307,027, filed December 1, 1939. The present invention is directed to an improvement and simplification of the previous system. It utilizes improved means for generating the controlling potentials to be applied to the cathode ray tube deflecting plates. Such improved generating means forms the subject matter of copending application of R. I. Roth, Serial No. 313,062, filed January 9, 1940, and A. H. Dickinson, Serial No. 313,061, filed January 9, 1940. Other features of the present invention reside in the provision of a combined clock and auto-call system. Each cathode ray tube secondary clock may either display a time indication under control of the master clock or display a call number which is set up at a central control point. Since a clock may display either clock time or a call number provision is made to display a special indication at a secondary clock when a call number is being displayed. According to the present invention the same lines are utilized to transmit the proper controls to the clocks for either time display or call number display.

General layout of system

Figure 1:
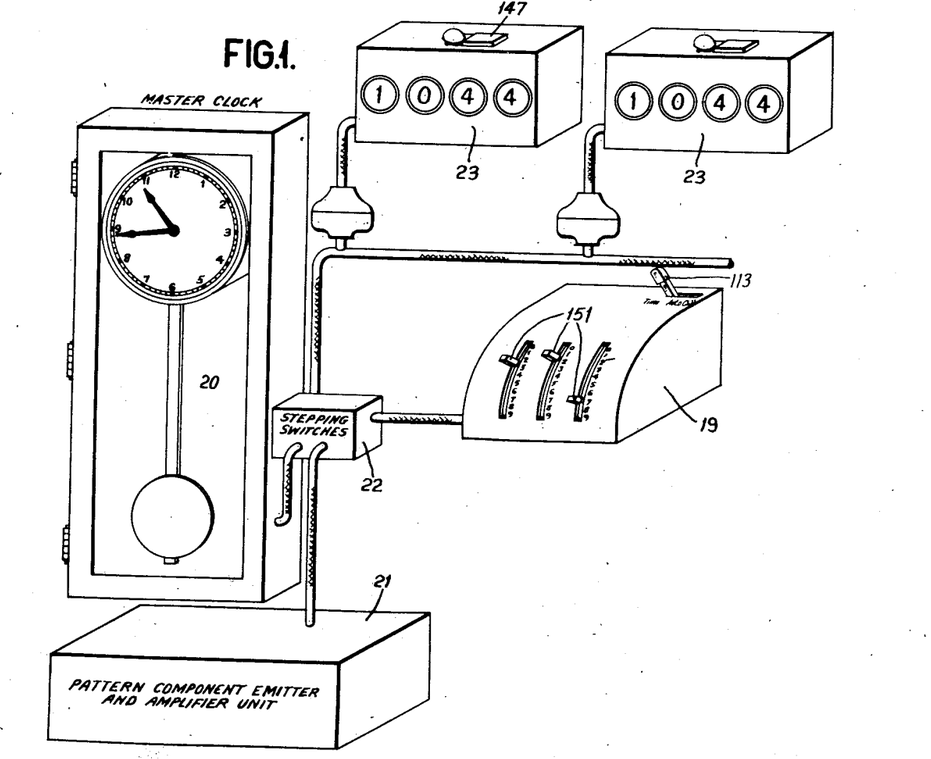
Figure 1 is an isometric view of a complete clock and call system.

Referring to Fig. 1, 20 generally designates the master clock unit. 21 is the pattern component emitter and amplifier unit. 22 designates the stepping switch unit which is controlled from the master clock unit. Secondary clocks are designated 23. While only two of such secondary clocks are shown it is obvious that the system may be intended to include any number of such secondary clocks. The secondary clocks may be connected by plugs to suitable cables which extend to the stepping switch unit and the stepping switch unit is in turn cabled to the pattern component unit and is also connected by cables to the master clock unit. The unit generally designated 19 designates the set up unit which can be set up by hand for a desired call number.

Master clock

Figure 2:
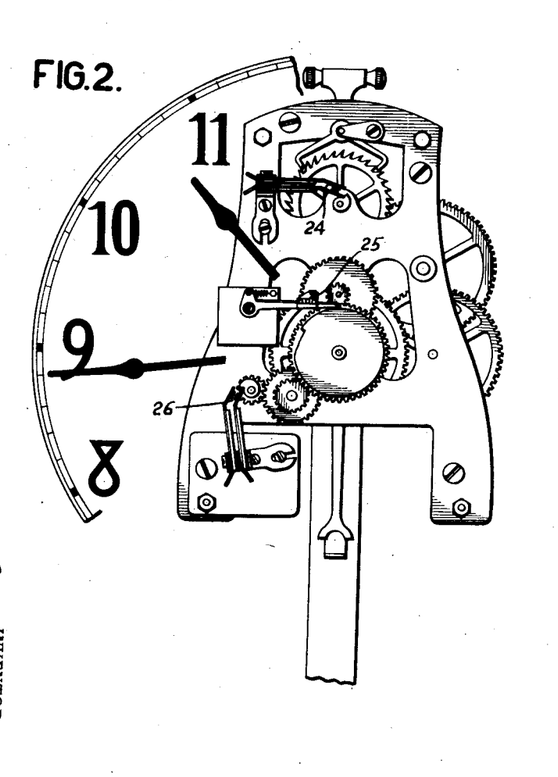
Fig. 2 is a fragmentary detail view of the master clock.

Referring to Fig. 2, the master clock may be of any suitable type. The one herein shown is of the type shown in United States patent to Bryce, No. 1,687,481. The master clock in addition to having the usual minute contacts 24 and hour contacts 25 is provided with a supplemental set of contacts 26 which close every ten minutes. These contacts are cam operated in the customary way and the cam is geared back to the hour gear to make one revolution every ten minutes.

*General characteristics of cathode ray tubes*

Figure 15A:
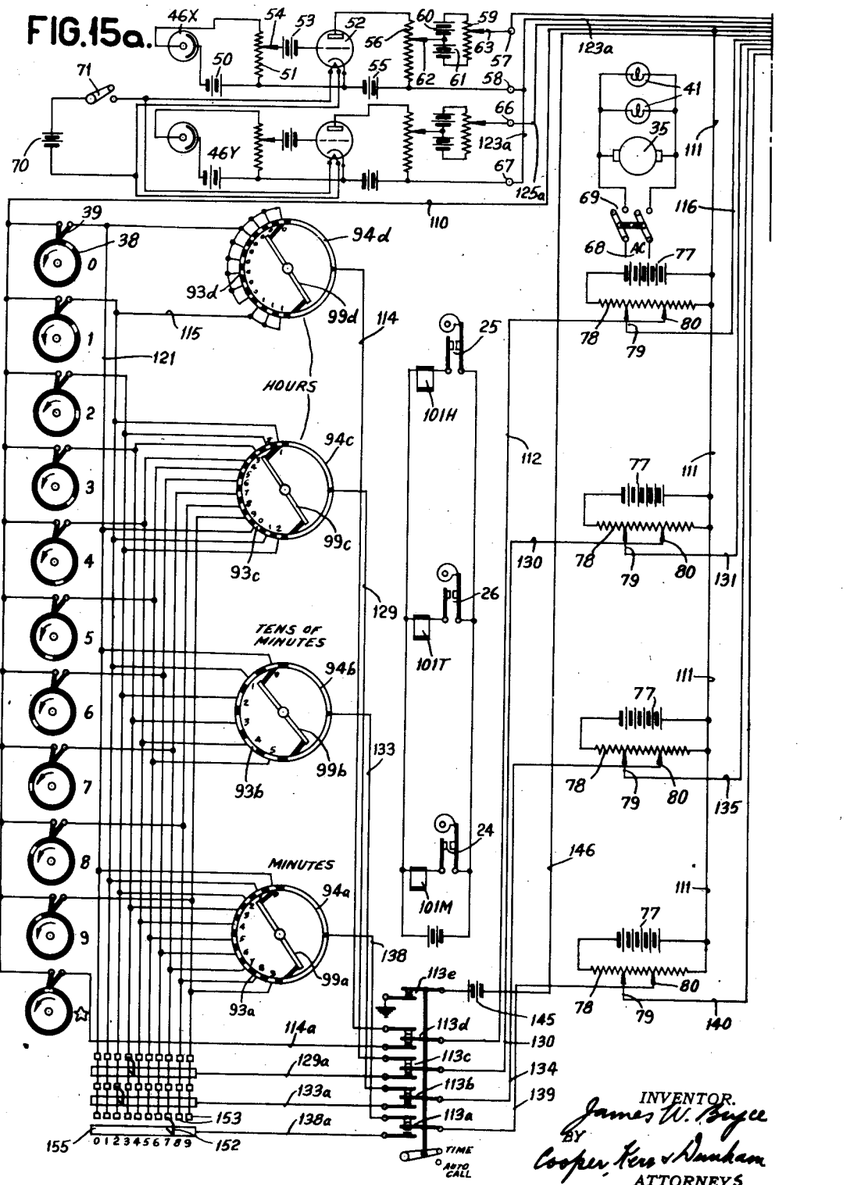
Figs. 15a and 15b taken together and Fig. 15b to the right of Fig. 15a show the complete diagram of the clock and call system.
Figure 15B:
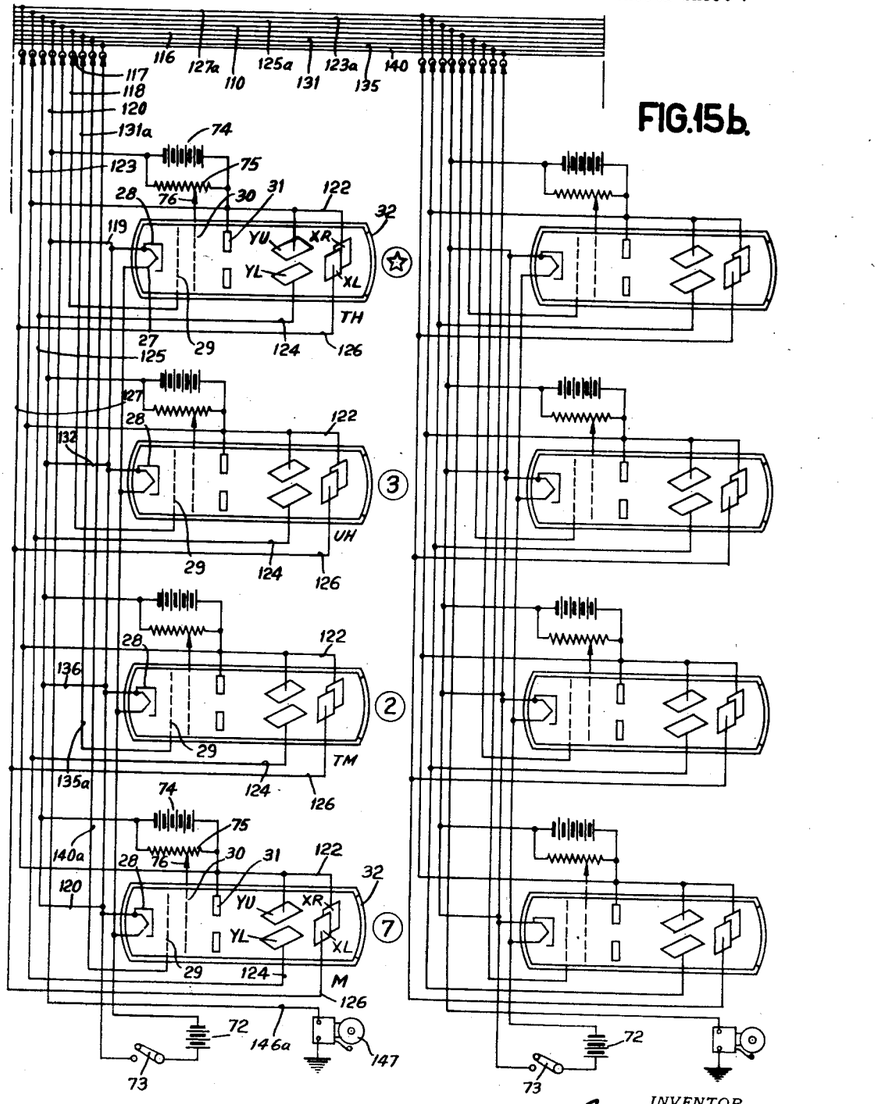

Before describing the details of the system, the general characteristics of the cathode ray tubes which are used in the secondary clocks may be briefly described. A typical and suitable cathode ray tube is illustrated diagrammatically on the circuit diagram (Fig. 15b). Such a tube comprises an evacuated body into which extends a heater element 27. Associated with the heater element is a cathode 28 providing a source of electrons. Also within the evacuated body and disposed in order from left to right is a grid 29, an anode number "1" designated 30, an anode number "2" designated 31 and two pairs of deflector plates. The upper and lower vertical deflector plates are respectively designated YU and YL and the horizontal deflector plates are designated XL and XR. XL signifies horizontal deflection to the left and XR horizontal deflection of the right. The right hand end of the cathode ray tube includes the usual fluorescent screened end 32. The Y deflector plates are plates above and below the center axis of the tube. The X deflector plates are disposed to the right and left of the center axis of the tube.

In the operation of the cathode ray tube, if no potential is applied to either set of plates the stream of electrons will be emitted along the central axis of the tube and impinge on the fluorescent screen 32 at the center of the screen. This will illuminate a spot at the center of the tube. If, however, the potential on the horizontal and vertical deflecting plates is changed, the stream of electrons can be deflected either upwardly or downwardly or to the right or the left or in combined resultant directions. Changing relative potential on the Y set of plates will bring the stream of electrons up or down and similarly changing the relative potential on the X plates will divert the stream of electrons alternatively to the right or left. By providing proper potential and proper changing potential over a period of time on both sets of plates any desired figure or character can be traced on the fluorescent screen 32. By repeatedly tracing the beam of electrons to the proper points or areas of the screen, an image may be produced which can be visibly read in the day time or at night. Cathode ray tubes are adapted to operate and deflect electron beams at an exceedingly high frequency. They may accordingly be termed "inertia free image tracing devices."

Having generally described the characteristics of a cathode ray tube, there will now be described one manner of providing the deflector voltages which control the movements of the tracing of the electronic beam of the various tubes.

*Pattern component emitter unit*

Figure 9:
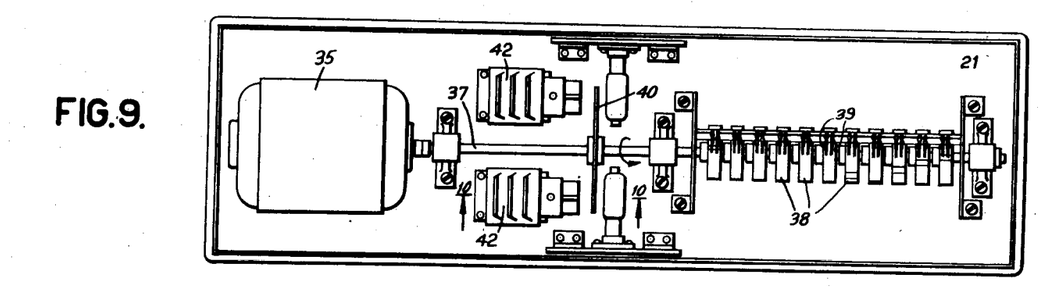
Fig. 9 is a top plan view of the pattern component emitter unit with the cover removed to show the parts beneath the cover.

The pattern component emitter assembly 21 (see Figs. 1 and 9) includes a driving motor 35 which is adapted to constantly drive suitably journalled shaft 37. Shaft 37 at one end drives a number of commutator devices designated 38. Eleven of these commutators are provided. Each commutator (see Fig. 15a) comprises an insulating portion over the greater portion of the periphery together with a conducting portion at a single point on the commutator. Trailing on the periphery of each commutator are a pair of brushes which are designated 39 on Fig. 15a. The conducting segments on the different commutators are so arranged as to close the brush circuits at different angular positions of rotation of the shaft 38 as will be readily understood by inspection of Fig. 15a. The purpose of these commutators and their timing will be subsequently further explained.

Figure 10:
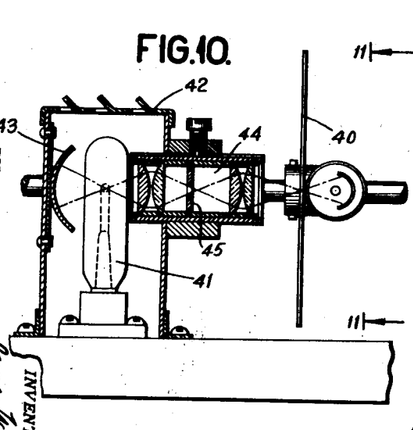
Fig. 10 is a detail sectional view taken on line 10—10 of Fig. 9.

Again referring to Fig. 9 the shaft 37 is also adapted to drive and rotate a rotatable element here shown as a disk 40. This disk 40 is generally transparent, but it is provided with two concentric opaque tracks 40X and 40Y (see Fig. 11). To direct light upon the tracks a pair of light sources are provided. Each source of light preferably comprises a lamp 41 within the lamp box 42 (Fig. 10). A suitable reflector 43 directs the light from the lamp through a lens system 44 and an apertured diaphragm 45 on to the tracks on the disk. One light source directs light to the 40X track and the other light source directs light to the 40Y track. Upon the opposite side of the disk 40 from the light source there are provided two photo-cells which are respectively designated 46X and 46Y. It will be noted that the tracks vary in the width of the opaque portion. Accordingly, more or less light will pass by these tracks and affect the related photo-cells upon rotation of the disk. It may be explained that if the width of the opaque portion of one of the tracks such as 40X is varied at different angular positions around the disk 40 different amounts of light will be allowed to pass to the photo-cell 46X upon rotation of the disk. This variable illumination will vary the current and/or voltage output in a circuit controlled by this particular photo-cell. The photo-cells act to allow more or less current to flow in their output circuits depending upon the amount of light which they receive.

Figure 11:
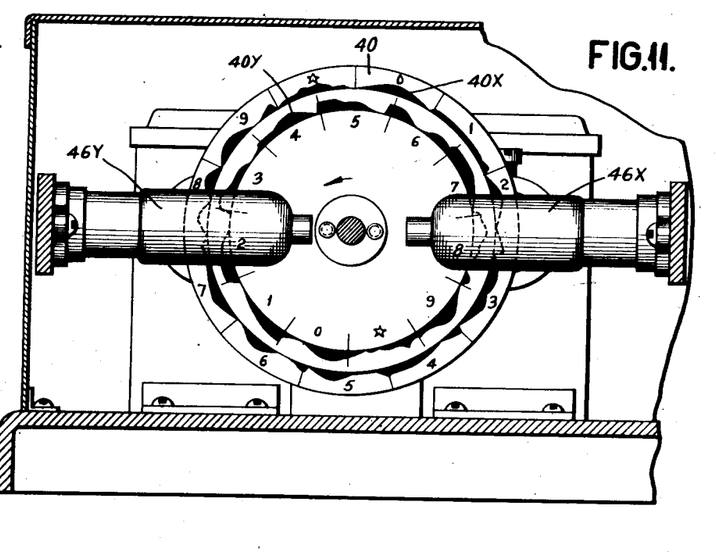
Fig. 11 is an elevational view taken on line 11—11 of Fig. 10.

Referring now to Fig. 11, it will be noted that the disk 40 is shown as divided up into successive sections or segment portions. The segment portions of the 40X track have been each given a designating figure such as 0, 1, 2, 3, 4, 5, 6, 7, 8, 9 and a star. The segments or sections pertaining to the 40Y track are likewise designated with figure numbers. It will be noted that correspondingly numbered segments of the two tracks are 180 degrees out of phase on the disk. This relation is required because of the fact that the photo-cells 46Y and 46X are disposed 180 degrees apart.

The purpose of the varying contour of the opaque tracks is to provide for proper varying illumination upon the photo-cells so that the output terminals of the amplifier which are connected to the photo-cells will receive changing potential during the rotation of the disk over the segment zone. This varying potential is then applied to the plates of a cathode ray tube or tubes and by applying proper changing potential to both sets of plates in such sets of tubes an outline of various figures can be traced. The manner of laying out the various segments of the disks will now be explained.

Figure 12:
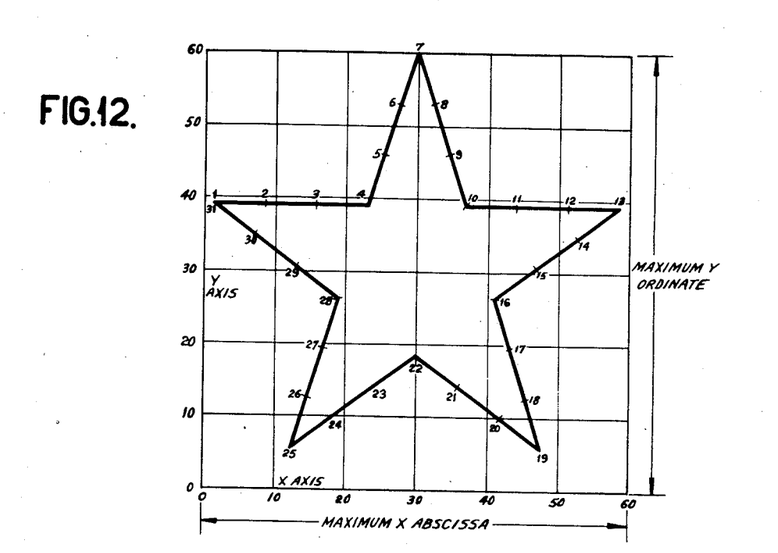
Fig. 12 is a diagrammatic graph view showing plotting laid out for the star character.
Figure 14:
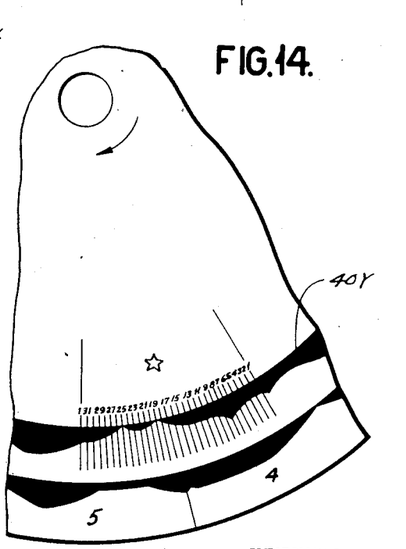

Referring to Fig. 12, the outlines of a five pointed star have been laid out. This star has been divided up into a set of sections of equal length, this particular character being divided into sections from 1 to 31 inclusive. In order to trace the electron beam for the left upper point of the star the Y component voltage should be maintained constant while points 1 to 4 are traced. If the inner track (for controlling the Y potential) on Fig. 14 be examined, it will be found that the 40Y track has a constant width from all points from 1 to 4 inclusive.

Figure 13:
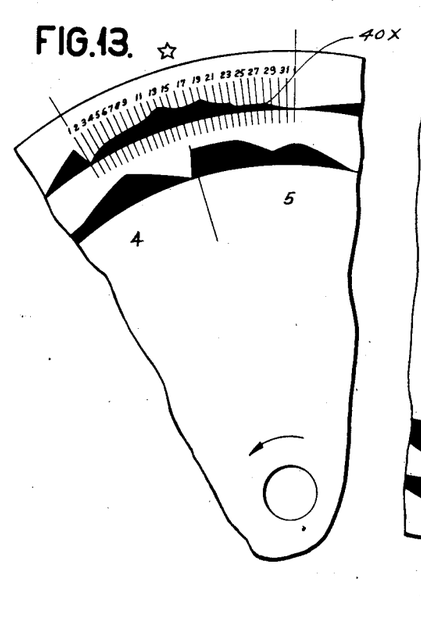
Figs. 13 and 14 are enlarged details of portions of certain segment sections of the disk shown in smaller scale on Fig. 11.

Considering now the 40X track for the same points 1 to 4 it will be noted that there is a rather rapid increase of width of such track. This causes the tracing beam to be moved rapidly to the right for tracing from point 1 to 4. From point 4 to point 7 the tracing beam should be caused to move upward and to the right. Accordingly, the 40Y track gradually increases in width from point 4 to point 7 and the 40X track (Fig. 13) also gradually increases in width from point 4 to point 7.

The above explanation need not be further continued for further points around the star character.

It should be noted that when the tracing beam is to be held stationary in one direction its related track should have a constant width. When it is to change, the width of the opaque portion is progressively increased or decreased as the case may be. When the track width increases the beam moves either upwardly or to the right and when it decreases the beam either moves downwardly or to the left. The above of course applies to both tracks.

To determine the width of the 40Y track at any point as for example, point 15, the Y ordinate distance on Fig. 12 between the X axis and point 15 is measured. This distance is then multiplied by a constant, the value of which is determined in a manner to be subsequently described. The resultant amount will give the width of the Y track at point 15 on the disk. The constant above referred to is the ratio of a predetermined arbitrary maximum width of the Y track on the disk with respect to the maximum ordinate value for the character in Fig. 12. This arbitrary value depends upon the circuit relation and characteristics of the photo-cells and amplifier tubes which are used in connection with the track. The width of the 40X track at point 15 is the X abscissa of point 15 multiplied by another constant. This constant is the ratio of the predetermined arbitrary maximum width of the X track with respect to the maximum abscissa value for the character in Fig. 12. This arbitrary value again depends upon the circuit relations and characteristics of the photo-cells and amplifier circuits.

Referring now to Fig. 11 when the disk 40 is in continuous counterclockwise rotation, the 46X and 46Y photo-cells will in succession receive such varying amounts of illumination as to successively afford the changing potential for first tracing the outline of the character 2, then as the next segment is reached, the outline of the character 3, then for the following segment the character 4 and so on up to 9 with the star outline traced following 9.

From the foregoing explanation it will be understood that if both light sources were on and that both photo-cells were in circuit through certain amplifier units to a given cathode ray tube that as the disk 40 is rotated through one complete revolution all of the various character outlines for the digits 1 through 9 inclusive and the star would be successively traced on the screen of a cathode ray tube. It may be mentioned that the disk 40 is rotated extremely rapidly and the rate of rotation is such that a visual image is displayed which can be seen even if the cathode ray tube is operated only for one segment portion of the disk. To provide for a display of the single digit or single character by the cathode ray tube the commutator devices 38 previously alluded to will hereinafter be described. The disk device together with its photo-cells and light sources constitute what might be termed "a pattern component unit." If such disk is maintained in a state of rotation at relatively high speed it will be appreciated that such disk can be used to progressively vary the X component voltages and the Y component voltages which are applied to the cathode ray tube or tubes.

It may be further mentioned that a single rotatable element or disk can be utilized for controlling one or more cathode ray tubes.

Before describing the commutator and switching control for the various cathode ray tubes, the amplifier circuits for the photo-cells will be explained.

*Photo-cell and amplifier units*

As explained before two photo-cells 46Y and 46X are employed.

Amplifier circuits preferably including electron discharge devices are controlled by the photo-cells 46X and 46Y. These amplifier circuits are adapted to produce variations in potentials across the deflecting plates of the cathode ray tubes in accordance with the variations of light impressed on the photo-cells.

Consider for example, photo-cell 46X which is utilized to control the horizontal deflection of the cathode ray beam in one or more of the cathode tubes. Such photo-cell 46X is connected in series with a battery 50 and a resistor 51 whereby the difference of potential across the resistor varies in accordance with the illumination of the photo-cell. The grid cathode circuit of a vacuum tube 52 conveniently biased negative at all times by the battery 53 includes a portion of the resistor. The plate cathode circuit of the tube 52 includes a B battery or other source of direct current 55 and a resistor 56 in series therewith intermediate the positive side of the battery 55 and the plate of the tube 52. For impressing a proper voltage across the horizontal deflecting plates XL and XR of the cathode ray tubes which are connected to the terminals 57 and 58 of the amplifier unit, a biasing network is preferably provided including a resistor 59 connected across a source of voltage preferably comprising the series connected batteries 60 and 61. The conductor intermediate batteries 60 and 61 is also connected to a preliminarily adjustable contact tap 62 on the resistor 56 and the terminals 57 and 58 are respectively connected to a preliminarily adjustable contact tap 63 on the resistor 59 and to the positive side of the battery 55 (i. e. the positive end of the resistor 56).

It will now be seen that if the photo-cell 46X receives illumination or a predetermined maximum illumination, the grid of the tube 52 will have a predetermined maximum negative bias. The contact arms 54, 62 and 63 are conveniently so adjusted (in a manner which will be readily understood by those familiar with the art) that for this maximum illumination of the photo-cell 46X the resulting maximum negative bias on the grid on the tube 52 will be such that the output voltage between the terminals 57 and 58 will maintain the electron beam at one side of its horizontal path of travel, viz. the left hand side in the apparatus illustrated. That is, although the contact arm 62 is negative with respect to the positive side of the battery 55, the biasing network including the resistor 59 imposes sufficient opposing voltage in the deflector plates XL, XL so as to make the terminal 57 just sufficiently positive with respect to the terminal 58 to maintain the electron beam in its extreme left hand position. Now, as the illumination of cell 46X decreases (due to an increase in width of the opaque portion of the track) the negative bias on the grid of the tube 52 decreases, resulting in an increase in plate current and corresponding increase of the potential drop between the positive side of the battery 55 and the contact 62. As a result, the potential of terminal 57 becomes less positive with respect to the terminal 58; the adjustments of the contacts on the resistors being conveniently such that the potential between the terminal 57 and 58 becomes zero for an illumination of the photo-cell 46X which is intended to represent a positioning of the cathode beam at the middle of its horizontal path. Decrease of the illumination beyond this point results in making the terminal 58 positive with respect to the terminal 57, until at the point of minimum illumination the cathode beam is deflected to its extreme right hand position.

It will be understood that the amplifier and balancing circuits controlled by the photo-cell 46Y are conveniently identical with those herein above described for the photo-cell 46X so that the vertical displacement of the cathode beam between plates YL and YU is obtained by a corresponding similar variation of output potential between the terminals 66 and 67 to which these plates are connected.

Since it will now be understood that the actual position of the cathode ray beam at any instant depends upon the controlling potentials applied to both sets of deflecting plates XL, XR and YL, YU, the position of the beam is directly controlled (through the instrumentality of the amplifier circuits described) by the amount of illumination respectively received by the photo-cells 46X and 46Y. Thus as the illumination respectively received by these photo-cells varies during rotation of the pattern component emitter, the cathode ray beam of any one of the tubes traces a path to portray the particular digit character corresponding to the sector of the disk which is being scanned by the photo-cells. If the tracks of the segment portions pertaining to the digit 7 are being scanned, such scanning so controls the illumination of the photo-cells that the tracks 40X and 40Y respectively provide a predetermined variation in the illumination of the photo-cells 46X and 46Y for each traverse of the segment of the disk providing resultant corresponding variations in deflecting potential on the plates of the cathode ray tubes whereby the cathode ray beam traces a path—in this case, a path depicting the character 7 which is predetermined by the zone of the disk which is being scanned. As shown on Fig. 15a, the lamps 41 and the motor 35 may receive current from a suitable source 68 through a switch 69.

The heater elements of the amplifier tubes 52 are preferably arranged to receive current from a suitable source 70 upon closure of switch 71. As shown on Fig. 15b, a battery 72 affords current supply for the heater elements of the cathode ray tubes upon closure of switch 73.

Referring to Fig. 15b as is customary with cathode ray tubes, a biasing battery 74 is provided for each tube. This battery is shunted by a resistor 75. A contact tap 76 of this resistor connects to the anode designated 30 (i. e. the number "1" anode of the cathode ray tube). As is customary in cathode ray tube practice, the commonly connected deflector plates YU and XR and the number "2" anode designated 31 are commonly connected to the positive end of the resistor 75.

Before describing the switching control for the cathode ray tubes it may be mentioned that if grid 29 of any tube has applied to it a certain maximum negative bias the effect will be to wholly suppress the impingement of the electron beam upon the fluorescent screen 32. On the other hand if this certain maximum negative bias is reduced on the grid 29 the effect will be to allow the impingement of the beam on the screen. To provide such grid bias control a battery 77 is provided shunted by resistor 78 (Fig. 15a). Cooperating with the resistor are two adjustable contact taps 79 and 80. Tap 79 connects to the grid 29. The positive end of the resistor 78 is connected back to the cathode heater element 28. If the entire resistor 78 is in circuit with the battery 77 the certain maximum negative bias previously mentioned will be applied to the grid 29. On the other hand, if a part of the resistor 78 (i. e. the portion to the right of contact tap 80) is shunted out, then this certain maximum negative bias will be reduced to allow impingement of the electron beam on the screen of the cathode ray tube.

The application of the maximum negative bias and the reduction of maximum negative bias for a particular tube or tubes is controlled from the commutator devices previously mentioned. For example, if it is desired to display the character 7, the brushes of the related commutator 38 establish contact during the scanning of the 7 zone of the disk 40 and upon such commutator brushes establishing contact the portion of the resistor 78 to the right of the tap 80 is shunted out thereby allowing flow of the electron beam with the resulting tracing of the character 7 upon the screen of the tube.

Having generally described the characteristics of the pattern component emitter devices and the general manner of control of the cathode ray tubes it may be explained that the selection of the character is effected in a manner which will now be described.

Without tracing details of the circuit it may be explained that if one of the commutators shown in Fig. 15a is in circuit, the character or digit corresponding to such commutator will be displayed on a tube or tubes. If the commutator is out of circuit on the other hand, the character corresponding to the commutator will not be displayed. Selective control for the commutators according to the present invention is afforded in either of two ways. First, if the various secondary clocks of the system are to be used to display a call number together with the star, which signifies that the display number is a call number and not time, a manually set switching mechanism is utilized. On the other hand if the various secondary clock units are to display time of day under the control of the master clock, the commutators are brought in circuit through certain stepping switch mechanisms, which stepping switch mechanisms are under control of the master clock. There is furthermore a switch on the set up unit which cuts the stepping switches out of operation and control when a call number is to be displayed. This same manually operated member or switch also causes ringing of a bell at each secondary clock.

*Stepping switch mechanism*

Figure 3:
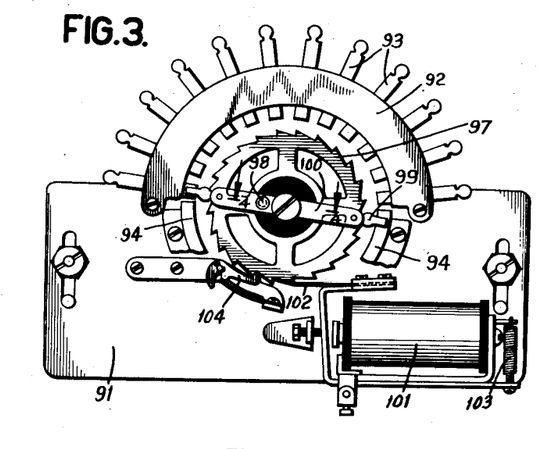
Fig. 3 is an elevational view of the stepping switch.
Figure 4:
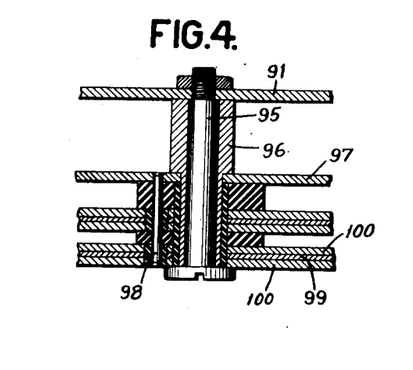
Fig. 4 is a detail sectional view taken on line 4—4 of Fig. 3.
Figure 5:
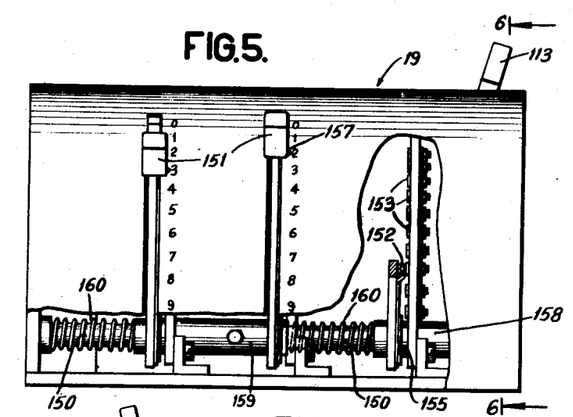
Fig. 5 is a front view of the setup devices for the call number. Certain parts are broken away in this view to show the interior construction.
Figure 6:
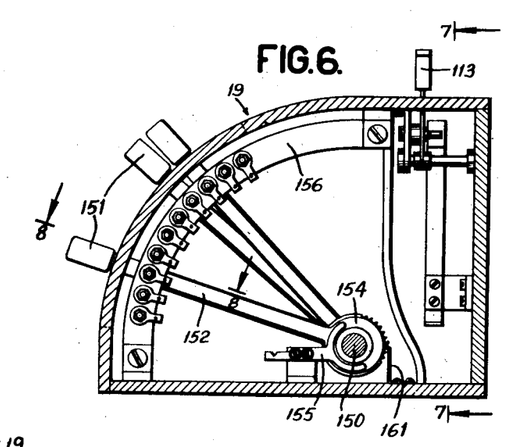
Fig. 6 is a detail sectional view of the apparatus of Fig. 5, the section being taken on line 6—6 of Fig. 5.
Figure 7:
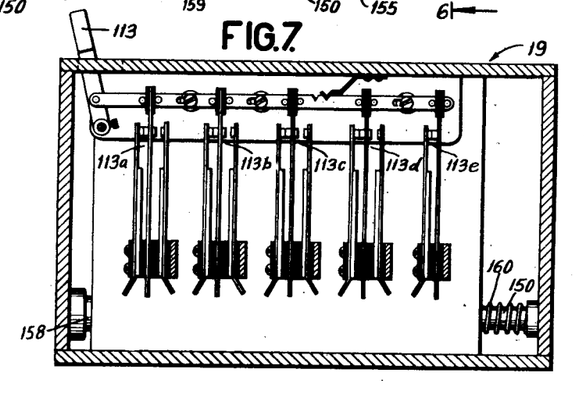
Fig. 7 is another detail view, the section being taken on line 7—7 of Fig. 6.
Figure 8:
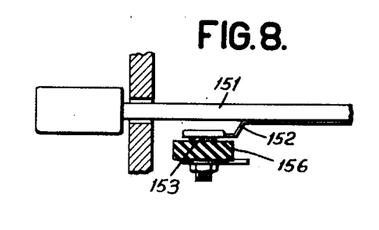
Fig. 8 is a detail sectional view, the detail section being taken on line 8—8 of Fig. 6.

In order to variably connect the cathode ray tubes of the secondary clocks to the pattern component emitter unit as the time changes, suitable switching mechanism is provided controlled by and from the master clock. While various forms of switching devices may be used, Figs. 3 and 4 show a suitable switching mechanism. 91 is a mounting plate which has mounted on it an insulating segment 92. Segment 92 is provided with metallic conducting pieces 93 which are distributed around the periphery as shown. A common conducting segment 94 is also mounted on plate 91 and insulated from it. Plate 91 has secured to it a stud 95 (see Fig. 4). Rotatable on the stud 95 is a sleeve 96 which has fast to it a ratchet 97. Secured to the ratchet by a suitable rivet 98 are two wiper arms 99. These wiper arms are disposed between insulating pieces 100 and the wiper arms are also insulated from the sleeve 96 in the manner shown in Fig. 4. As the ratchet 97 is rotated from one segment position to the next, the wiper arm 99 will provide a circuit from the common segment 94 successively to each of the individual segments 93. In order to rotate the ratchets step by step there is provided a magnet 101 which upon energization, is adapted to move an armature 102 to the right as shown in Fig. 3. Upon de-energization of the magnet, the armature returns to the left under the action of the spring 103, thereby rotating the ratchet 97 one step in a clockwise direction. Retrograde motion of ratchet 97 is prevented by a dog 104. In the complete system several of these stepping switch devices are provided. One stepping switch is provided with two sets of arms 99c and 99d (Fig. 15a). This is the stepping switch which controls hours indication. Another stepping switch for controlling tens of minutes indication is provided with a single arm 99b which single arm traverses six segment spots. Another stepping switch for controlling the display of minute indications has a single arm switch provided with an arm 99a which traverses ten segment spots. Inasmuch as there are three stepping switches there are three magnets 101, one for each switch and on the circuit diagram (Fig. 15a) these have been respectively designated 101H, 101T and 101M. H signifies hours, T tens of minute and M minutes. On the circuit diagram 24 are the master clock control contacts which close once a minute. These contacts on closure, energize stepping switch magnet 101M. 101M upon successive energization advances the arm 99a of the minute stepping switch. Contacts 26 are the master clock controlled contacts which close every ten minutes to energize stepping switch magnet 101T. This magnet in turn effects the advance of the tens of minutes stepping switch arm 99b. Contacts 25 are the master clock controlled contacts which close once an hour to energize stepping switch magnet 101H. 101H advances and stepping switch arms 99c and 99d.

Wiring of the segments of the various stepping switches will now be described.

Referring to the upper two stepping switches on Fig. 15a, the upper stepping switch with segments 93d and common segment 94d is the switch for designating the tens of hours. For the time indication of 1 to 9 hours, the tens of hours indication is 0 with the units of hour indications varying from 1 to 9 inclusive. Accordingly, the first nine segments of the 93d set are all wired together and such segments are wired over to the 39 brush of the 38 commutator pertaining to 0. The next three segments are likewise wired together and are connected to the brush of the commutator pertaining to a "1" digit. These last three segments are used for designating "1" of 10, 11 or 12 hours in the tens of hours switch.

Referring now to the units of hours stepping switch with segments 93c and common segment 94c there are twelve segments on this stepping switch. The first nine segments from 1 to 9 inclusive are respectively wired to the brushes of the number 1 to 9 commutators. The next three segments are to control a time indication of 0, 1 and 2 respectively and these are accordingly wired back to the 0, 1 and 2 commutator brushes.

Referring now to the tens of minutes stepping switch with common segments 94b and 94c, the six segments of this switch are respectively wired to the 0 to 5 commutator brushes.

Referring now to the minutes switch with common segments 94a, the segments of this switch are respectively wired to the 0 to 9 commutators.

Having described the wiring of the various stepping switches it will be assumed that the master clock has advanced the stepping switches so that they assume a position to represent a time indication of 44 minutes past 10. For such a condition the 99a arm will be on the "4" segment spot. The 99b arm will be on the "4" segment spot, the 99c arm will be on the "0" spot and the 99d will be on the first of the three segment spots marked "1", i. e. that segment spot just right of the last zero spot.

With arm 99d in the above position the number "1" commutator 38 will be rendered effective and will establish a circuit upon closure of the commutator brush contacts as follows: From one of the brushes 39, via line 110, wire 111, to the right hand end of the resistor 78 pertaining to the tens of hours cathode ray tube, the circuit shunts a portion of the resistor to the contact tap 80, wire 112, contacts 113d, now in the position shown, wire 114, the common segment 94d, switch arm 99d, to the first of the number "1" segment spots and then via a line 115 to the other brush of the number "1" commutator. Accordingly, when the commutator 38 designated number "1," makes, which is at the time the "1" segment of the disk 40 is being scanned by the photo-cells, such commutator will shunt out the right hand end of the resistor 78. When such portion of the resistor is shunted out the biasing circuit through tap 79 is established, which biasing circuit is completed through wire 116 (see also Fig. 15b) through a plug and socket connection in plug 117 for example, wire 118 to the grid 29 of the tens of hours cathode ray tube generally designated TH. This circuit will remove the high negative bias from such grid 29 and allow the digit 1 to be traced on the fluorescent screen of this cathode ray tube.

It may be mentioned that the circuit from the cathode element 28 extends via wire 119 to a wire 120 through the plug back to line 110 which extends back (see Fig. 15a) to wire 111 to the right hand end of the resistor 78.

The circuits from the terminals of the amplifier unit to the YU, XR, YL and XL plates will now be traced.

Referring to Fig. 15b, the YU and XR plates of the TH tube are connected to a line 122 which extends through wire 123, through a plug connection to wire 123a (see also Fig. 15a), which extends and connects with amplifier terminals 58 and 67. It may be mentioned that all tubes are provided with such a wire 122 and the YU and XR plates of all tubes are connected to the amplifier terminals 58 and 67. Referring now to the circuit for the YL plate of the TH tube this plate is connected to a wire 124, connected to a wire 125, which through the plug, connects to a wire 125a, (see also Fig. 15a) which connects to the terminal 66 of the amplifier unit.

Referring now to the XL plate of tube TH, this plate is connected to a wire 126 connecting to a wire 127 which extends to the plug connection to a wire 127a which extends to the 57 amplifier terminal (Fig. 15a). It may be mentioned that the YL and XL plates of all of the tubes have similarly wired connections going back to the corresponding amplifier terminals.

From the foregoing it will be understood that when high negative bias is removed from grid 129 of the TH tube that the proper changing potentials will be applied to the deflecting plates of this tube from the amplifier unit to trace the digit 1.

Referring now to the 99c switch arm, this arm is now standing on the 0 segment spot. Upon closure of the 0 commutator, a circuit will be completed when the commutator makes at its brushes which is at the time the 0 segment of the disk 40 is being scanned. This circuit is from line 110, through the 0 commutator, via wire 121, through the 0 segment spot of the 93c set, through the switch arm 99c, through the common segment 94a, to line 129, through the 113c contact in the position shown, via wire 130 to the 80 contact tap of the 78 resistor pertaining to the units of hours cathode ray tube, through the resistor to line 111. The right hand end of this resistor is connected back to the other side of the commutator through line 111 and wire 110. When the commutator closes its contacts the right hand end of the resistor 78 is shunted out and a change of bias is applied to line 131 through contact tap 79. Line 131 extends over through a plug connection to a line 131a which leads to the grid 29 of the units of hours cathode ray tube generally designated UH. This will provide for the removal of negative bias from this grid and the character 0 will be traced on the fluorescent screen of this tube. The return circuit from the cathode 28 of the UH tube is connected back, via wire 132 to the line 120 and thence via the circuit previously traced to the line 111 and the resistor 78. The circuits to the deflecting plates of this tube need not be traced as they are connected to the amplifier terminals in the manner previously explained.

Referring now to the tens of minutes stepping switch the switch arm 99b of this switch will be standing on the 4 segment spot of the 93b set and upon the common segment 94b. The number 4 commutator will be connected in circuit and when the commutator contacts close a circuit is established through a wire 133, contacts 113b in the position shown, wire 134, contact tap 80 on the resistor 78 pertaining to the tens of minutes cathode ray tube and back to lines 111 and 110 to the other side of the commutator. The tap 79 of the resistor is connected to a wire 135 which leads through a plug connection to a wire 135a extending to the grid 29 of the tens of minutes cathode ray tube generally designated TM. The cathode element 28 of this tube is connected back via line 136 to the wire 120, which extends back via a circuit previously traced to the wire 111 and to the right hand end of the resistor. This circuit will provide for the removal of high negative bias from the grid 29 of the TM tube and will permit the digit 4 to be traced on the fluorescent screen of this tube when the 4 segment of disk 40 is being screened by the photo-cell.

Referring now to the minutes stepping switch arm 99a, this switch is standing on the 4 segment spot of the 93a set and upon common segment 94a. A circuit will be completed through the number 4 commutator, through the 4 segment spot, through 99a, 94a to a wire 138, contacts 113a in the position shown, wire 139 to tap 80, through a portion of the resistor 78 back to wire 111. Upon closure of the number 4 commutator, there is a change in negative bias on line 140 which leads through a plug connection to wire 140a (Fig. 15b) which extends to the grid 29 of the minutes cathode ray tube designated M. From the cathode 28 of this tube there is a circuit established to wire 120 which leads back to wire 110 and 111 to the right hand end of the resistor 78 pertaining to this tube. Upon closure of the number 4 commutator contacts, the high negative bias will be removed from the grid of the minutes tube and the digit 4 would be traced on the screen in this tube.

By the foregoing descriptions, the various circuits including the deflecting plate circuits and the negative bias controlled circuits have been explained to show how the cathode ray tubes visually display a time indication of ten hours and forty-four minutes. When the master clock advances to the next minute, minute contacts 24 close and advance the minute stepping switch arm 99a from the 4 segment spot to the 5th segment spot. This operation of this stepping switch will cut the number 4 commutator out of circuit and place the number 5 commutator in circuit. Accordingly, the high negative bias will now be removed from the minutes cathode ray tube by the number 5 commutator at the time when the commutator brushes of this commutator establish their circuit. This will provide for the removal of high negative bias from the controlled grid of this tube and will permit the character or digit 5 to be displayed on this tube instead of 4 which was the display for the previous time indication. The operation need not be traced for further time indications as it is substantially similar to that previously explained.

It will be noted in Fig. 15b that a second set of cathode ray tubes are shown to the extreme right of the figure. These are the cathode ray tubes pertaining to another secondary clock and they will have the same time indication displayed thereon as that previously described.

*Number call system*

If at any time it is desired to call an individual provision is made for setting up a call number at a station adjacent the master clock and then for cutting out the master clock control to the cathode ray secondary clocks and for ringing a bell at each secondary.

Referring to Fig. 1 on the set up unit 19, there is shown a switch lever 113. This lever is left in the time position when master clock time indications are to be displayed at the remote secondaries and is placed in the auto-call position when auto calls are to be sent out. Shifting the lever 113 to the auto-call position shifts contacts 113a to 113e to the reverse position from that shown on Fig. 15a. Upon such shift, contacts 113e close and establish a ringing circuit from a battery 145 to a line 146 which extends to a line 146a in each secondary clock extending to a bell 147. The bell thus rings continuously when the system is being used for auto call purposes.

Referring again to Fig. 15a, shift of the contacts 113a to 113d to the reverse position from that shown cuts out of circuit all of the stepping switches controlled by the master clock. The circuits which are cut are designated 114, 129, 133 and 138. Upon shift of the switch 113 to the auto call position circuits are established from wires 112, 130, 134 and 139 respectively to wires 114a, 129a, 133a and 138a. Wires 129a, 133a and 138a extend through an auto call number switching device and from the other side of this switching device circuits extend back to the 0 to 9 commutators. The 114a circuit extends directly to the star commutator.

The auto call switching device will now be described. Referring to Figs. 5, 6, 7 and 8, lever 113 as previously mentioned shifts contacts 113a to 113e inclusive to either of two positions as will be readily understood. Also within the set up unit there is mounted a cross-shaft 150, affording a support for three levers 151. Each of these levers carries a contact strip 152 which is adapted to traverse contact segments 153 (see also Fig. 5). The contact strip 152 of each lever has a collector ring portion 154 upon which trails a collector brush 155. The segments 153 previously mentioned are suitably supported on insulating strip 156. Each arm 151 is provided with an index pointer 157 and the front of the case is provided with indications adjacent each pointer marked 0 to 9 inclusive.

The operator can position the various handles to indicate any desired number as will be readily understood. To provide friction to hold the arms in set position, a pair of insulating bushings 158 and 159 are provided on the shaft 150 and compression springs 160 press the arms towards these bushings. To provide further means for retaining any arm in its operator's set position a spring detent 161 may be provided (see Fig. 6).

Figure 1A:
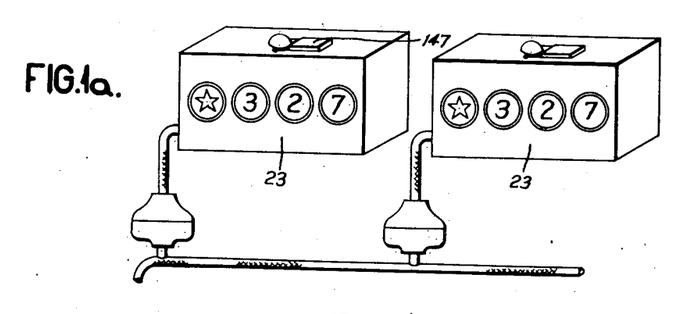
Fig. 1a is a fragmentary detail view of the secondary clock units showing such units utilized for displaying a call number.

Referring now to the circuit diagram (Fig. 15a), the hand set switching device is diagrammatically indicated as being set for a call number of 327. With this device so set the number 3 commutator will remove high negative bias from the UH cathode ray tube whereupon the digit 3 will be displayed by this tube. The number 2 commutator will remove high negative bias from the TM cathode ray tube, whereupon 2 will be displayed by this tube and the number 7 will remove high negative bias from the M tube, whereupon 7 will be displayed by this tube. The star commutator which is connected to line 114a will remove high negative bias from the TH tube and cause this tube to display a star. The call number indication at the various secondary clocks will accordingly be as shown in Fig. 1a.

What I claim is:

1. A clock system including a master clock and one or more secondary clocks, common transmission lines between the master and secondary clocks, each secondary clock comprising a set of cathode ray tubes to afford a multiple order character display of either clock time characters or call indication characters, common potential generating means for generating the potentials required for tracing character display of any of the required different characters by the cathode ray tubes of the secondary clocks, switching means and circuits controlled by the master clock for selectively causing the cathode ray tubes to display time indicating characters corresponding to master clock time under control of the potentials transmitted over the transmission lines from the common generating means, call number setting up switching means independent of the master clock control switching means and circuits for selectively causing the cathode ray tubes to display call indicating characters, as determined by the setting of said switching means and under control of the potentials transmitted over the transmission lines from the common generating means, means to selectively associate either of said last mentioned means with the secondary clocks whereby the latter may display clock time or call indications and means to visually designate at the secondary clock that call characters are being displayed.

2. A clock and call system according to claim 1 wherein the means to designate that call characters are being displayed comprises a special generating means for causing one tube of each clock to display a special designation indicative that other characters pertain to call indications, and means rendered effective under control of the selective associating means when set for call number display for causing such special designations to be displayed.

3. A clock system including a master clock, a plurality of secondary clocks, each secondary clock having common displaying means for displaying alternatively clock time and call indications, a common source of representations of both clock time and call numbers, a call number switching device for setting up call numbers at a station adjacent the master clock, a common set of lines leading from the master clock to the secondary clocks, and means to selectively transmit from the aforesaid common source over the same common set of lines to the common displaying means of each secondary clock either representations of clock time or call numbers, said means being under the control of the master clock when clock times are to be transmitted and under the control of the call number switching device when call numbers are to be transmitted.

4. A clock system comprising a master clock and time selecting switching means controlled thereby, a call indication selecting switching means, secondary clocks, common transmission lines alternatively connected between each of the secondary clocks and either the time selecting switching means or the call indication selecting switching means, a common indicating device at each secondary clock for indicating either clock time or a call indication, and selecting means for selectively associating the common indicating device through said transmission lines either to the time selecting switching means to indicate clock time or to the call indication selecting switching means to indicate a required call indication.

JAMES W. BRYCE.